United States Patent [19]

Sharaby et al.

[11] Patent Number: 4,797,443
[45] Date of Patent: Jan. 10, 1989

[54] STABILIZED VINYL HALIDE RESINS AND COMPOSITIONS AND ARTICLES MADE THEREFROM

[75] Inventors: Zaev Sharaby, Cleveland Heights; Josef C. Vyvoda, Avon Lake, both of Ohio

[73] Assignee: The B. F. Goodrich Company, Akron, Ohio

[21] Appl. No.: 728,548

[22] Filed: Apr. 29, 1985

[51] Int. Cl.$^4$ .............................................. C08K 5/13
[52] U.S. Cl. ................................................. 524/347
[58] Field of Search .............. 524/347, 205, 209, 291, 524/334, 330, 331, 340, 343; 526/84; 426/415

[56] References Cited

U.S. PATENT DOCUMENTS

| | | | |
|---|---|---|---|
| 2,296,363 | 9/1942 | Messer | 524/342 |
| 2,427,071 | 9/1947 | Reuter | 524/347 |
| 2,549,118 | 4/1951 | Newby | 524/330 |
| 2,625,521 | 1/1953 | Fischer et al. | 524/343 |
| 2,662,867 | 12/1953 | Hoertz | 524/347 |
| 2,728,659 | 12/1955 | Loria et al. | 568/766 |
| 2,832,808 | 4/1958 | Zerbe | 528/205 |
| 3,424,821 | 1/1969 | Hunter | 524/347 |
| 3,953,531 | 4/1976 | Ohi | 524/347 |
| 4,209,648 | 6/1980 | Cottman | 568/766 |
| 4,315,850 | 2/1982 | Kugele | 524/330 |
| 4,401,798 | 8/1983 | Ceprini et al. | 526/84 |
| 4,412,897 | 11/1983 | Kornbaum et al. | 524/347 |
| 4,478,986 | 10/1984 | Reid | 526/84 |
| 4,484,000 | 11/1984 | Howell | 560/75 |

FOREIGN PATENT DOCUMENTS 1022719 3/1966 United Kingdom .

OTHER PUBLICATIONS

Murfitt—British Plastics Dec. 1960, pp. 578-581.

*Primary Examiner*—Veronica P. Hoke
*Attorney, Agent, or Firm*—Joe A. Powell

[57] ABSTRACT

Stabilized vinyl halide compositions are provided by adding to said vinyl halide compositions an effective amount of a stabilizer having the substituted hydroquinone structure:

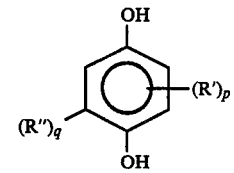

wherein

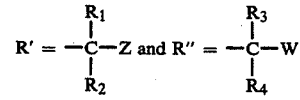

wherein
p is 1 or 2 and
q is 0 or 1;
provided that p+q=1 or 2.

The groups $R_1$, $R_2$, $R_3$, $R_4$, Z and W are defined hereafter.

The stabilizer is added at any point in the process after the desired state of polymerization is achieved.

13 Claims, No Drawings

STABILIZED VINYL HALIDE RESINS AND COMPOSITIONS AND ARTICLES MADE THEREFROM

BACKGROUND OF THE INVENTION

Any material, whether natural or synthetic must exhibit satisfactory resistance to degradation under conditions of use, if products made from the materials are to find a lasting market. A lack of satisfactory resistance to degradation usually manifests itself as a partial or total loss of structural integrity, a darkening or discoloration of the product, a loss of flexibility, or a combination of the above phenomena. These phenomena are promoted or catalyzed by air (oxygen), heat and light.

Vinyl halide polymers are particularly susceptible to degradation by heat because of the high temperatures at which these polymers must be processed to make useful articles. Processes such as extruding, calendering and molding are all performed at elevated temperatures. Also there is much exposure to heat in the normal manufacturing processes. After being polymerized, vinyl halide resins are steam stripped of residual monomer and dried, all at elevated temperatures. The steam stripping process normally reaches temperatures well above 100° C.

To protect these vinyl halide resins from heat degradation, it is customary to add materials known as stabilizers. Stabilizers are usually added by the formulaters at the time other ingredients such as processing aids, fillers, colorants and the like are added. This method of adding the stabilizers at the time of compounding is satisfactory, but it leaves the resin unprotected against heat during post polymerization manufacturing operations such as stripping and drying. In some circumstances this delay in adding the stabilizer will result in off-color or dark resin.

Stabilizers are not normally added prior to or during the stripping operation because of a tendency of these materials to contaminate the recovered monomer and to be relatively ineffective when added to a wet resin. Unreacted monomer is captured and recycled to make polymer from the post polymerization operation (blowdown tank, stripper and dryer). If stabilizers are carried over by the recycled monomer, they can adversely effect the later polymerizations.

Many stabilzers have been proposed for vinyl halide polymers and several have enjoyed wide acceptance by the industry. Stabilizers usually fall within one of four classes: (1) inorganic compounds; (2) metallo-organic salts or soaps (sometimes included under the inorganic class); (3) true organometallics containing a carbon-to-metal bond; and (4) pure organic compounds. Many of these stabilizers, although effective, are not approved for applications which come in contact with food and beverages.

It would be desirable to have a vinyl halide resin which is stabilized against heat degradation during post polymerization manufacturing operations and later end uses. It would also be desirable to have a stabilizer which is suitable for use in food grade applications.

SUMMARY OF THE INVENTION

It is an object of this invention to provide a method of stabilizing vinyl halide polymers against heat degradation during the post polymerization polymer manufacturing operations as well as stabilized for end use.

It is a further object to this invention to provide a stabilized vinyl halide resin.

These and other objects which will become apparent from the following specification are accomplished by the use of at least one novel stabilizer having the following chemical structure:

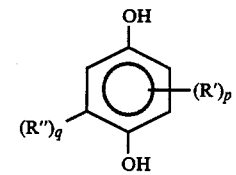

wherein

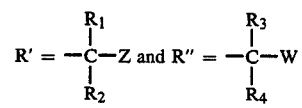

wherein p is 1 or 2 and q is 0 or 1; provided that $p+q=1$ or 2.

The groups $R_1$, $R_2$, $R_3$, $R_4$ are either H, $CH_3$, or $C_2H_5$ and are identical or different. The groups Z and W may be identical or different and are either H, $C_1$ to $C_{12}$ hydrocarbon, $OR_5$, $SR_5$, phenyl, alkyl benzene, $C_nH_{2n+1-k}-(X)_t-R_6$ wherein n is an integer from 1 to 20, $k=1$ or 2, $t=0$ or 1, $X=$—O— or

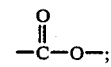

wherein $R_5$ and $R_6$ are H or $C_1$-$C_{12}$ hydrocarbon, CN, or $C_nH_{2n+1-k}CN$ wherein n and k are as defined above.

Preferably the stabilizer is a 2,5 substituted hydroquinone having the formula:

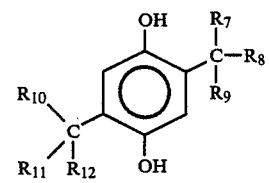

wherein $R_7$, $R_8$, $R_{10}$ and $R_{11}$ may be the same or different and are either H, methyl, or ethyl. $R_9$ and $R_{12}$ may be the same or different and are either H, or an alkyl having from 1 to about 12 carbon atoms. Preferably, $R_7$, $R_8$, $R_{10}$ and $R_{11}$ are methyl and $R_9$ and $R_{12}$ are either methyl or ethyl.

DETAILED DESCRIPTION

The halogenated vinyl resins of this invention are polymers or compolymers of vinyl halides such as vinyl chloride or vinyl bromide. Copolymers can contain up to 50% by weight of one or more other polymerizable comonomer, typically containing a vinylidene group ($CH_2=C<$), however, most effective stabilization is realized with copolymers wherein vinyl halide is 80% or more by weight. Preferred are vinyl chloride homopolymers. Monomers copolymerizable with the vinyl halide monomers include vinylidene chloride, vinyl acetate, ethyl acrylate, methyl methacrylate, acrylonitrile, methacrylonitrile, styrene, ethylene, propylene and the like. Halogenated vinyl resins also include post-chlorinated vinyl halide polymers. The post chlorinated polyvinyl chloride resins generally have a density in the range between about 1.40 and 1.70 and a weight % chlorine content from about 58% to about 70%. In addition to the aforementioned compositions, blends of halogen containing resins with non halogenated polymers may also be stabilized in accordance with the present invention.

The halogenated vinyl resins employed may be prepared by any of the polymerization processes which are well known to the art. Such methods include emulsion, solution, suspension, micro-suspension and bulk or mass polymerizations. The halogenated vinyl resins may also be prepared by a modified suspension process using a thickened reaction medium as is disclosed in U.S. Pat. No. 4,435,524 (incorporated herein by reference).

The halogenated vinyl resins are stabilized by adding thereto at least one compound having the following structure:

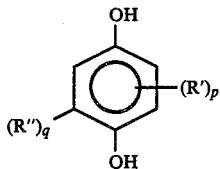

wherein

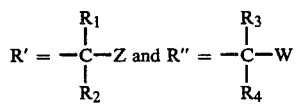

wherein p is 1 or 2 and q is 0 or 1; provided that $p+q=1$ or 2.

The groups $R_1$, $R_2$, $R_3$, $R_4$ are either H, $CH_3$, or $C_2H_5$ and are identical or different. The groups Z and W may be identical or different and are either H, $C_1$ to $C_{12}$ hydrocarbon, $OR_5$, $SR_5$, phenyl, alkyl benzene, $C_nH_{2n+1-k}-(X)_t-R_6$ wherein n is an integer from 1 to 20, $k=1$ or 2, $t=0$ or 1, $X=$—O— or

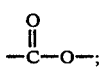

wherein $R_5$ and $R_6$ are H or $C_1$-$C_{12}$ hydrocarbon, CN, or $C_nH_{2n+1-k}CN$ wherein n and k are as defined above.

The $C_1$ to $C_{12}$ hydrocarbon for Z, W, $R_5$ and $R_6$ may be straight or branched alkyl, $C_3$ to $C_{12}$ straight or branched alkenyl, or $C_3$ to $C_{12}$ cycloalkenyl.

Preferably the stabilizer is a 2,5 substituted hydroquinone having the formula:

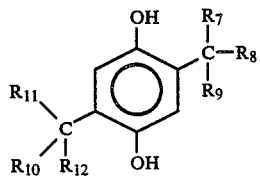

wherein $R_7$, $R_8$, $R_{10}$ and $R_{11}$ may be the same or different and are either H, methyl, or ethyl. $R_9$ and $R_{12}$ may be the same or different and are either H, or an alkyl having from 1 to about 12 carbon atoms. Preferably, $R_7$, $R_8$, $R_{10}$ and $R_{11}$ are methyl and $R_9$ and $R_{12}$ are either methyl or ethyl.

Examples of suitable preferred stabilizers are 2,5-di-t-amylhydroquinone; 2,5-di-t-butyl hydroquinone and the like. The compound 2,5-di-t-amylhydroquinone was found to be a particularly desirable stabilizer.

The amount of the novel stabilizer normally used in this invention is from about 0.0010 to about 0.1000 part by weight per 100 parts by weight of vinyl halide polymer. Preferably the amounts used are from about 0.0050 to about 0.0200 part by weight per 100 parts by weight of vinyl halide polymer. Amounts higher than about 0.1000 part by weight per 100 parts by weight of polymer are normally not necessary, however, for special high heat applications, larger amounts may be desirable. Amounts larger than 0.1000 part by weight per 100 parts by weight of vinyl polymer result in even further stability in color but are normally not necessary.

When the stabilizer is added to the polymerization vessel, blowdown tank or other location prior to drying, the levels are expressed in terms of parts by weight per 100 parts by weight of monomer in the polymerization recipe. If the stabilizer is added to a dry resin, then the level is expressed as parts by weight per 100 parts by weight of polymer or resin. There is a small difference, because all of the monomer in the polymerization recipe does not convert to polymer. Usually the conversion in from about 60 to 90 percent of monomer is converted to polymer.

The stabilizers of this invention are readily prepared according to the teachings of U.S. Pat. No. 4,484,000, which is hereby incorporated by reference. The preferred stabilizers are prepared by the alkylation of hydroquinone according to the teachings of U.S. Pat. No. 2,832,808, which is hereby incorporated by reference.

The stabilizer of this invention may be added to the vinyl halide polymer at any time once the polymer is polymerized to the desired state. For example, the stabilizer may be added in the polymerizer, blowdown tank, stripper, dryer, or during the formulation operations such as milling, extruding, blending and the like. The stabilizer may be added in one addition or multiple additions. For example, a small amount of about 0.0025 part by weight per 100 parts by weight of monomer may be added in the polymerizer and the remainder added during the formulation or compounding operation. For best results, at least about 0.0010 part by weight per 100 parts by weight of monomer should be added before the resin is stripped so as to protect the resin from the exposure to heat during stripping. The polymerizer or blowdown tank are the preferred places to add the stabilizer because the stabilizer is very soluble in the monomer and is carried into and diffused throughout the polymer. Excellent dispersion of the stabilizer is achieved by adding it in the polymerization reactor.

If the stabilizer of this invention is added prior to drying, it is preferred to add the stabilizer as a solution dissolved in an organic solvent such as an alcohol, although the stabilizer could be added as an aqueous dispersion. If added in the compounding operations, the stabilizer is preferably added as a powder and mixed into the polymer in a customary manner as is well known to those skilled in the art. More than one stabilizer of this invention may be added to the resin. Also stabilizers known before this invention may be added with the stabilizer of this invention in the formulation operations of mixing, extruding and the like. It is not recommended to add conventional stabilizers in the pre-drying operations.

The excellent ability of the stabilizers of this invention to diffuse into the polymer allows them to be added in the polymerizer, blowdown tank, or stripper. This is an unusual feature of a stabilizer and most would not be added at this early stage because they would be lost in the water removal and monomer stripping operations. Also some stabilizers would be carried over in the monomer recovery system and contaminate subsequent polymerization batches.

Another important feature of the stabilizers of this invention is their non toxic nature. For example, 2,5-di-t-amylhydroquinone is approved by the United States Food and Drug Administration for use in contact with food.

An excellent test to determine the thermal stability of a vinyl halide resin is to measure the HCl evolution rate at 190° C. In this test the resin sample is exposed to 190° C. temperature. Gaseous hydrogen chloride is eliminated from isothermally degraded resins and is transported by an inert carrier gas into an analyzer flask containing deionized water. The concentration of HCl in the analyzer flask is determined by the continuous measurement of the conductivity of the HCl solution. The result is expressed as mol percent of available HCl eliminated versus time.

Another measure of thermal stability of a vinyl halide resin is color development test. This test measures the change in color when a resin is exposed to heat. The test method is to expose resin samples to air at 104° C. for different times. Samples are removed from the heat exposure at periodic time intervals and dissolved as a 10% solution in THF solvent. The optical density at 360 nanometers is measured. The darker the resin becomes from degradation the higher the optical density will be.

The following examples will illustrate the invention more fully, but are not intended to be limiting.

EXAMPLE I

This example is presented to show the effectiveness of using 2,5-di-t-amylhydroquinone as a stabilizer when the stabilizer is added in the polymerization reaction vessel at the point when the desired conversion is achieved. The polyvinyl chloride resin of this example is a spherical particle polyvinyl chloride homopolymer made by the modified suspension (thick medium) process described in U.S. Pat. No. 4,435,524. In addition to the stabilizer of this invention (Run No. 5), two known stabilizers were evaluated (Runs 2 and 3). Also a catalyst destroyer was added in Run 4 and a control with no stabilizer was evaluated in Run 1. The stabilizer additives were used at a level of 0.0075 part by weight per 100 parts by weight of monomer. The maximum HCl evolution rate at 190° C. rate was measured. The results are shown in Table I.

TABLE I

| Run No. | Stabilizer | Maximum HCl (mole %/min) evolution rate |
|---|---|---|
| 1 | None - Control | 0.0495 |
| 2 | Bis Phenol A | 0.0420 |
| 3 | 2,6-di-t-butyl-4-methylphenol | 0.0405 |
| 4 | Acetone Thiosemicarbazone | 0.0555 |
| 5 | 2,5-di-t-amylhydroquinone | 0.0210 |

As can be seen from the data of Table I, the stabilizer of this invention (Run No. 5) was very effective in reducing the HCl evolution rate. Runs 2 and 3 are known stabilizers but they were only partly effective. The results of this experiment are very unexpected.

EXAMPLE II

This example is presented to show that 2,5-di-t-amylhydroquinone is effective in delaying the color development in a film grade polyvinyl chloride resin. In this example, two compositions of this invention, 0.0100 and 0.0500 part by weight of stabilizer (2,5-di-t-amylhydroquinone) per 100 parts by weight of resin were mixed with an unstripped dry resin. The resin was exposed to air at 104° C. Every 10 minutes a sample was taken and dissolved as a 10% solution in tetrahydrofuran (THF) and the optical density measured at 360 nanometers. A control was also run with the same resin but with no stabilizer. The results are shown in Table II.

TABLE II

| | | Optical Density | |
|---|---|---|---|
| Exposure Time (min.) | Control Resin | Control with 0.0100 part by wt. stabilizer | Control with 0.0500 part by wt. stabilizer |
| 0 | 0.012 | 0.020 | 0.018 |
| 10 | 0.014 | 0.021 | 0.020 |
| 20 | 0.032 | 0.022 | 0.021 |
| 30 | 0.063 | 0.032 | 0.024 |
| 40 | 0.100 | 0.066 | 0.024 |
| 50 | 0.138 | 0.080 | 0.029 |

The data in Table II shows that the stabilizer of this invention is effective in reducing the color formation in polyvinyl chloride resins. An important factor is the delay time before the onset of color development. With the stabilizer of this invention used at the 0.0100 part by weight per 100 part by weight of polymer, the onset time is about twice as long as with the control. When the stabilizer is used at the 0.0500 part by weight per 100 part by weight of polymer, the improvement is even more dramatic. After 50 minutes, the sample with the higher level of the novel stabilizer had not even started to develop color. This is important in that it is the safety net time one has during the processing of the resin into useful articles. The very slightly higher optical density for initial samples (0 time) of the stabilized resin present no problem in that the difference is very small.

The stabilized resins of this invention are suitable for many applications. They may be compounded with fillers, colorants, lubricants, other stabilizers and the like to form vinyl halide resin compositions. They may be extruded and fused to make pipe, house siding, windows and the like. They may also be calendered into sheet form for use as films and the like.

The ability of the novel stabilizers of this invention to be added to the resin prior to its exposure to the high temperature of the steam stripping process is an important feature. Only then can the resins be protected from the polymerization vessel to the end use product.

We claim:

1. A stabilized vinyl halide resin composition comprising a vinyl halide resin and at least one 2,5-substituted hydroquinone stabilizer having the formula

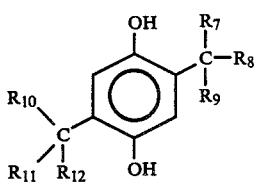

wherein $R_7$, $R_8$, $R_{10}$, and $R_{11}$ are methyl and $R_9$ and $R_{12}$ are either methyl or ethyl.

2. A composition of claim 1 wherein said vinyl halide resin is a vinyl halide copolymer containing at least 80 percent by weight of vinyl chloride.

3. A composition of claim 1 wherein said vinyl halide resin is a vinyl chloride homopolymer.

4. A composition of claim 1 wherein said vinyl halide resin is a blend of a vinyl chloride homopolymer and a post chlorinated vinyl chloride polymer.

5. A composition of claim 1 wherein said stabilizer compound is 2,5-di-t-amylhydroquinone.

6. A composition of claim 5 wherein the amount of stabilizer is from about 0.0010 part by weight to about 0.1000 part by weight said parts by weight based on 100 parts by weight of resin.

7. A composition of claim 1 in the fused state.

8. A shaped article comprising at least one fused vinyl halide resin and at least one 2,5 substituted hydroquinone stabilizer having the formula

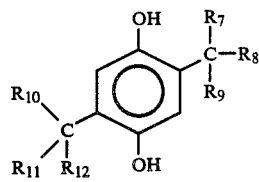

wherein $R_7$, $R_8$, $R_{10}$ and $R_{11}$ are methyl and $R_9$ and $R_{12}$ are either methyl or ethyl.

9. An article of claim 8 wherein said article is cylindrical in shape.

10. A method of stabilizing a vinyl halide resin comprising adding to said resin at least one 2,5 substituted hydroquinone stabilizer having the formula

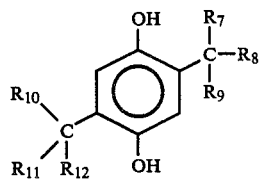

wherein $R_7$, $R_8$, $R_{10}$ and $R_{11}$ are methyl and $R_9$ and $R_{12}$ are either methyl or ethyl.

11. A method of claim 10 wherein said stabilizer compound is 2,5-di-t-amylhydroquinone.

12. A method of claim 10 wherein said stabilizer is added prior to the resin being stripped of residual monomer.

13. A method of claim 10 wherein said stabilizer is added after said resin is stripped of residual monomer.

* * * * *